United States Patent

[11] 3,630,086

| | | |
|---|---|---|
| [72] | Inventor | Leonard S. Wilk<br>Winchester, Mass. |
| [21] | Appl. No. | 48,416 |
| [22] | Filed | June 22, 1970 |
| [45] | Patented | Dec. 28, 1971 |
| [73] | Assignee | Massachusetts Institute of Technology<br>Cambridge, Mass. |

[54] CENTRIFUGAL-BALANCE GRAVITY GRADIOMETER
6 Claims, 6 Drawing Figs.

[52] U.S. Cl............................................................. 73/382
[51] Int. Cl............................................................. G01v 7/04
[50] Field of Search............................................. 73/382

[56] References Cited
UNITED STATES PATENTS

| 3,103,819 | 9/1963 | Blasingame | 73/382 |
| 3,564,921 | 2/1971 | Bell | 73/382 |

*Primary Examiner*—James J. Gill
*Attorneys*—Thomas Cooch, Arthur A. Smith, Jr. and Martin M. Santa ABSTRACT: An improved gradiometer for accurately measuring gravity gradients without the need for prior calibration. Since calibration is not required, the instrument operates independent of any external standards or references, except time. Further, one instrument in one orientation can provide all the components of the gravity gradient. The gradiometer comprises a suitably configured gradient sensor mass within a case which, in turn, is mounted within a cage such that its input axis is aligned with the axis of rotation of the cage. The entire assemblage is contained within a chamber which is preferably mounted on a stabilized base. Forces are induced on the sensor due to gravity gradients, causing the mass to move relative to its case. This motion is sensed and used to rotate the cage relative to the chamber. The angular rotation of the cage, in turn, causes the sensing device (specifically, its case) to rotate about an axis perpendicular to the inertia reaction forces on the sensor which are in an opposite sense to the forces induced on the sensor by the gravity gradients. The sensor is thus dynamically balanced. The angular velocity of the cage is indicative of the magnitude and direction of the gravity gradients being measured.

INVENTOR:
LEONARD S. WILK
BY Arthur A. Smith, Jr.
ATTORNEY

CENTRIFUGAL-BALANCE GRAVITY GRADIOMETER

The invention herein described was made in the course of work performed under a contract with The United States Naval Oceanographic Office, Department of the Navy.

BACKGROUND OF THE INVENTION

1. Field of the Invention

This invention relates generally to gravity measuring instruments and particularly to a centrifugal balance gravity gradiometer for use in orbiting spacecraft or in moving vehicles or on a fixed base, and in geophysical explorations.

2. Description of the Prior Art

With the advent of supersonic transport aircraft and with the design of new and improved missile systems, investigations are continually underway in the art to improve the accuracy and stability of the inertial guidance systems used therein. Since the performance of the inertial guidance systems is influenced by off-nominal gravity variations, various attempts have been made to measure these gravity variations in an effort to improve system performance.

It has also been known among geophysicists that various subsurface structures often indicate mineral deposits, such as oil, gas, and the like, and, further that minute variations in the gravitational field occur on the surface of the earth in the area of these subsurface structures. Accordingly, various instruments have been devised to measure the earth's gravity field and/or components thereof and gradient changes therein with the object of determining the location and extent of such deposits.

Primary among the various instruments proposed in the past for the measurement of the gravitational field and variations therein have been the so-called Eötvös Torsion Balance and the quartz gravimeters. These devices and others like them have proved to suffer severe limitations when used for geophysical explorations. For instance, all of these devices require a large number of individual measurements of the gravity gradient or gravity magnitude at different locations or stations on the earth's surface. The making of stationary field measurements is in and of itself a time-consuming process since the measuring instruments must be carried from point to point over the entire area to be surveyed. Further, certain of these devices, such as the Eötvös Torsion Balance, require a large degree of preparation time prior to the use thereof. These devices have further proved unsuitable for use in spacecraft and/or aircraft. For example, when attempts have been made to employ gravimeters in aircraft, it has been necessary to measure the elevation of the aircraft with extreme accuracy and then subtract out the acceleration and other forces acting thereon so as to calculate the gravity factor itself. Uncertainty altitude results in the lack of resolution which, in turn, seriously impedes the accuracy of the device itself. Likewise, the extreme sensitivity of the Eötvös Torsion Balance to vibration and to acceleration precludes its satisfactory use in spacecraft or aircraft.

Other instruments have been proposed and are in various states of development. These include Rotating Elastic Systems, Vibrating String Devices, Fluid Inertial Dipoles, to name but a few. These and others are fully described in "-Gravity Gradient Instrument Study," Manned Space Science Programs, Office of Space Science and Applications, N.A.S.A., a final report by Arma Division American Bosch Arma Corporation, Garden City, New York, on Contract NAS W–1328, Washington, D. C., Aug. 1966. All of these instruments suffer from one or more of the aforementioned disadvantages.

SUMMARY

In view of the foregoing limitations in the use of presently existing gravity measuring instruments, it is a general object of the invention to provide a single gradiometer instrument that can measure either the magnitude and direction of all components of the gravity gradients, or the magnitude of a selected component of the gravity gradient.

It is another object of the invention to provide a gradiometer that can easily and readily be usable in moving vehicles as well as at fixed locations, thereby greatly increasing its utility.

It is another object of the invention to provide an improved gradiometer that does not require calibration before its use.

These and other objects are met by a gradiometer that basically uses inertia reactive forces, which are due to rotationally induced centrifugal forces, to counteract the differential gravity acceleration forces due to gravity gradients acting on a test mass or float. Where the mass is configured and controlled in a suitable manner, the induced centrifugal forces act in a similar manner but with a different sense. By suitably measuring the effects of a lack of balance on the mass and adjusting the centrifugal forces to negate the lack of balance, the device will be in a dynamic balance. The characteristics of this established dynamic balance are related to the magnitude and direction of the gravity gradient acting on the instrument.

According to the invention, the improved gradiometer basically comprises a suitably configured sensor composed of a case within which is suspended a test mass of suitable configuration. In one type design, referred to as a transverse gravity gradient sensor, the test mass is permitted to rotate relative to the case about a single degree of freedom. The rotation is due to torques generated by gravity gradients and/or centrifugal forces. In the other type design, referred to as an in-line gravity gradient sensor, a pair of test masses is suspended within the case and the test masses are permitted to move along a single axis relative to the case. The differential movement of one mass relative to the other is due to forces generated by gravity gradients and/or centrifugal forces. The sensing device, in turn, is mounted within a cage such that its input axis is aligned with the axis of rotation of the cage. The entire assembly is contained within a second outer case or chamber which is preferably mounted on a stabilized base. Torques or forces are induced on the test mass configuration due to gravity gradients, causing them to move relative to its case. This movement is sensed and used to rotate the cage relative to the chamber. The angular rotation of the cage, in turn, causes the sensing device (specifically its case) to rotate about an axis perpendicular to the inertia reaction forces on the test mass which are in an opposite sense to the forces induced on the test mass by the gravity gradients. The test mass is thereby maintained in dynamic balance by the induced centrifugal forces. The angular velocity of the cage is indicative of the magnitude and direction of the gravity gradients being measured.

The device is configured such that the centrifugal forces acting on the test mass may be induced with a (nearly) constant angular velocity, an oscillation of angular velocity such that the direction of angular velocity may change or a combination of the two. Further, the means for measuring the angular velocity by which the centrifugal forces are induced may be either by a rate gyro or by other more conventional means. In either case the measurement can be continuous or time sampled. Preferably, the entire instrument is mounted on an inertially stable member.

The invention and the operation thereof will be apparent from the specification which follows in conjunction with the drawings.

DRAWINGS

PREFERRED EMBODIMENT

Figure 1:
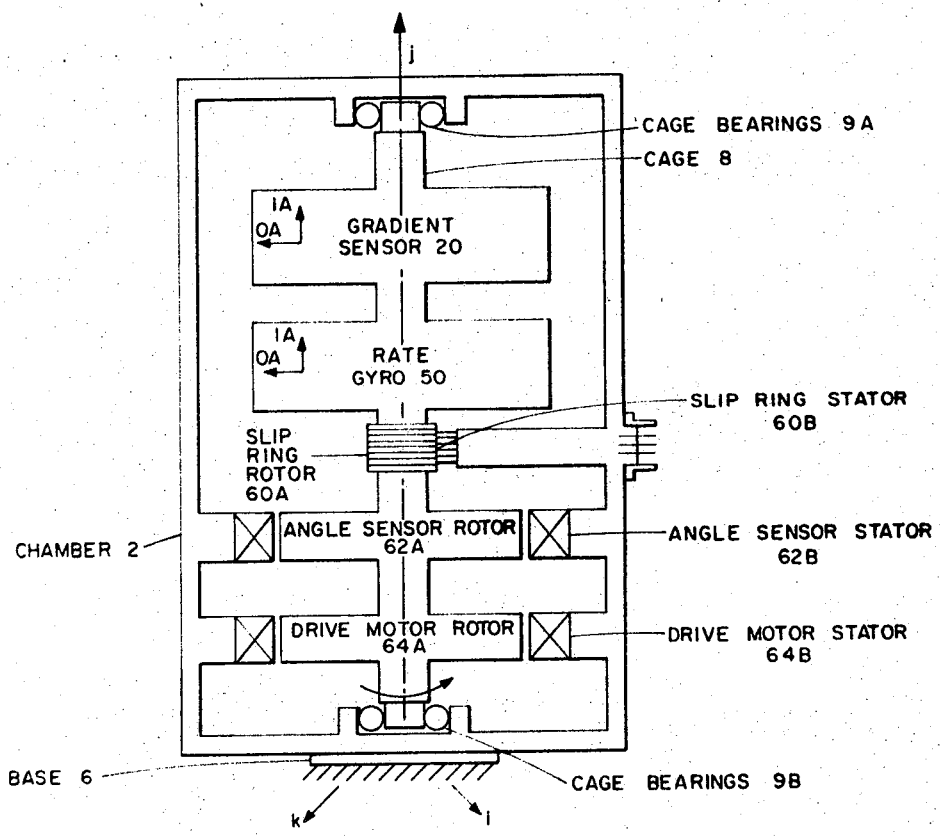
FIG. 1 is a schematic drawing of the gradiometer of the invention.

A preferred embodiment of the invention is shown schematically in FIG. 1. As noted therein chamber 2 is affixed to base 6 which, in the preferred embodiment, is stabilized relative to inertial space as defined by an inertial reference coordinate system $(i, j, k)$. Supported within chamber 2 and free to rotate relative thereto is cage (or shaft) 8 at each end of which is bearing pair 9A and 9B. Cage 8, in turn, supports gradient sensor 20, rate gyro 50, slipring rotor 60A, angle sensor rotor 62A and drive motor rotor 64A. Affixed to the inner surface of chamber 2 is slipring stator 60B arranged opposite to sensor rotor 60A, angle sensor stator 62B arranged opposite to sensor rotor 62A and drive motor stator 64B arranged opposite to drive motor rotor 64A. The input axis (IA) of rate gyro 50 is aligned with the input axis (IA) of gradient sensor 20, and both are aligned to the rotational axis of cage 8 (i.e., the $j$ axis). (The output axis (OA) of the rate gyro is not necessarily required to be aligned to the output axis (OA) of the gradient sensor and, in fact, in some applications it may be desirable to arrange the axes perpendicular to each other.)

Rate gyro 50 is a standard single-degree-of-freedom gyroscope such as that widely described in the literature as, for example, in U.S. Pat. No. 3,229,533, by C. S. Draper et al.; U.S. Pat. No. 2,752,790, by C. S. Draper; and U.S. Pat. No. 2,752,791, by J. J. Jarosh et al., and configured as a rate sensor. In fact, the invention is not limited to a gyroscope but will function as well with other types of rate sensors such as an angle sensor and time measurement.

Further, although a rate sensor is preferred, it is not necessarily required for all applications as will be discussed later in the specification. The sliprings, angle sensor and drive motor are all state-of-the-art components and, hence, need not be detailed further. For example, the angle sensor may be one of a variety of angle resolvers or transducers.

Figure 2:
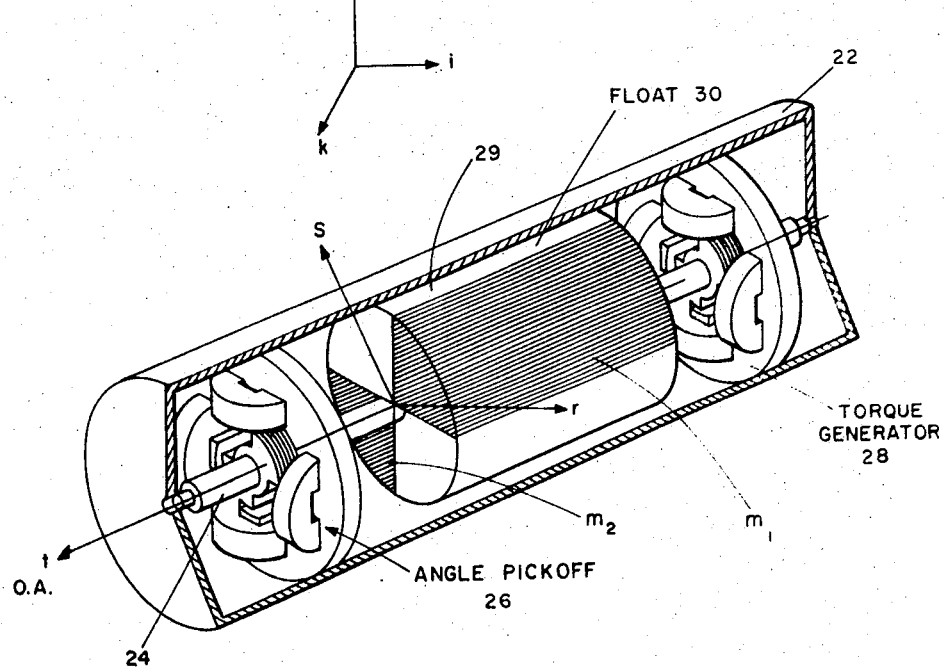
FIG. 2 is a cutaway view of the preferred embodiment of the gradient sensor, showing a transverse design.

A cutaway view of the preferred embodiment of gradient sensor 20 is shown in FIG. 2. As shown therein gradient sensor 20 comprises cylindrically configured outer case 22 along the axis of symmetry ($t$) of which is shaft 24, this axis being the output axis (OA) or axis of cylinder of the instrument. Rigidly affixed to shaft 24 within outer case 22 is cylindrically configured float 30. As explained in detail later in the specification, in the preferred embodiment, the gross mass distribution of float 30 is symmetrically configured and suitably shaped to minimize measurement errors.

The desired gross mass distribution is effected in the preferred embodiment by masses M1 and M2 incorporated within float 30 along a diameter. (Other configurations are acceptable provided the total or gross mass distribution is obtained as desired.) Mounted at one end of shaft 24 is angle pickoff 26 (a signal generator) which indicates angular displacement of float 30 with respect to case 22, and mounted at the other end of shaft 24 is torque generator 28 to apply necessary torques to the float. The torque generator is not essential to the invention but merely facilitates its use as it is employed only for setting up initial conditions and/or bias compensation. Between float 30 and outer case 22 is a small clearance space 29 which is filled with a viscous fluid to provide support to the float and necessary damping thereof.

Referring now to FIGS. 1 and 2 in conjunction with FIG. 3, which is a flow diagram of the null feedback loop, the instrument is operated basically as follows. Torques are induced on float 30 due to gravity gradients, causing float 30 to rotate about its output axis ($t$) relative to case 22. Thus, rotation is sensed by angle pickoff 26, suitably amplified by amplifier 26A, and fed back to drive motor 64 which causes cage 8 to rotate relative to chamber 2 about the $j$ axis. Angular rotation of cage 8 likewise causes case 22 of gradient sensor 20 and (where used) the case of rate gyro 50 to rotate about the $j$ axis. Since the $j$ axis is perpendicular to the output axis (axis of freedom) of float 30, a centrifugal force field is created having a sense opposite to that of the forces induced on the float by the gravity gradients, thereby diminishing the average torque on the float to a negligible value.

Figure 3:
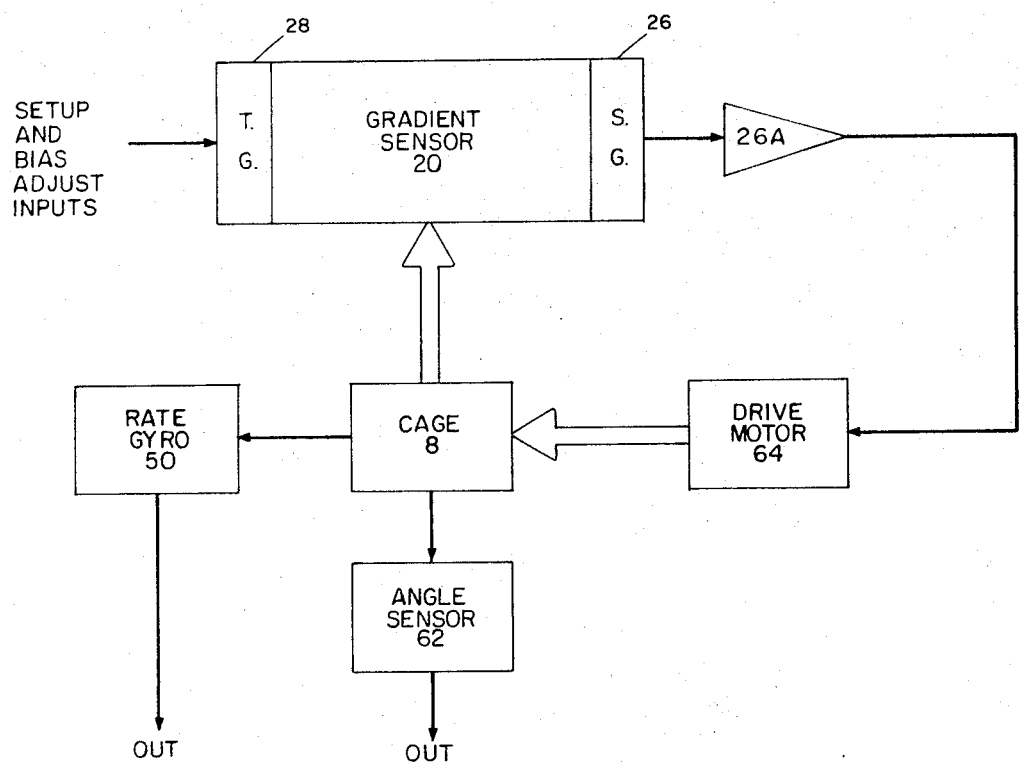
FIG. 3 is a flow diagram of a typical null feedback control loop used in the preferred embodiment of the invention.

The aforementioned control is effected via a feedback control loop operation, one example of which is shown in FIG. 3, so that the angle of float 30 relative to case 22 is maintained essentially unchanged. Thus, a balance is achieved between the forces due to gravity gradients and those due to centrifugal force. The output of the system, as indicated by the rate of rotation of cage 8, is indicative of the gravity gradients acting on the instrument. The rotation rate of cage 8 is measured by rate gyro 50 and the angle by sensor 62.

The gradient sensor of FIG. 2 is a transverse-type design as it measures cross-product. An alternate sensor configuration is the so-called longitudinal design (in-line) shown in FIG. 4. (As aforementioned, gradiometers are classified in the art as "transverse" or "longitudinal" depending on whether a cross-product or in-line measurement of gravity gradients is made. This is explained in the literature. See, for example, the previously referenced report entitled "Gravity Gradient Instrument Study.")

Figure 4:
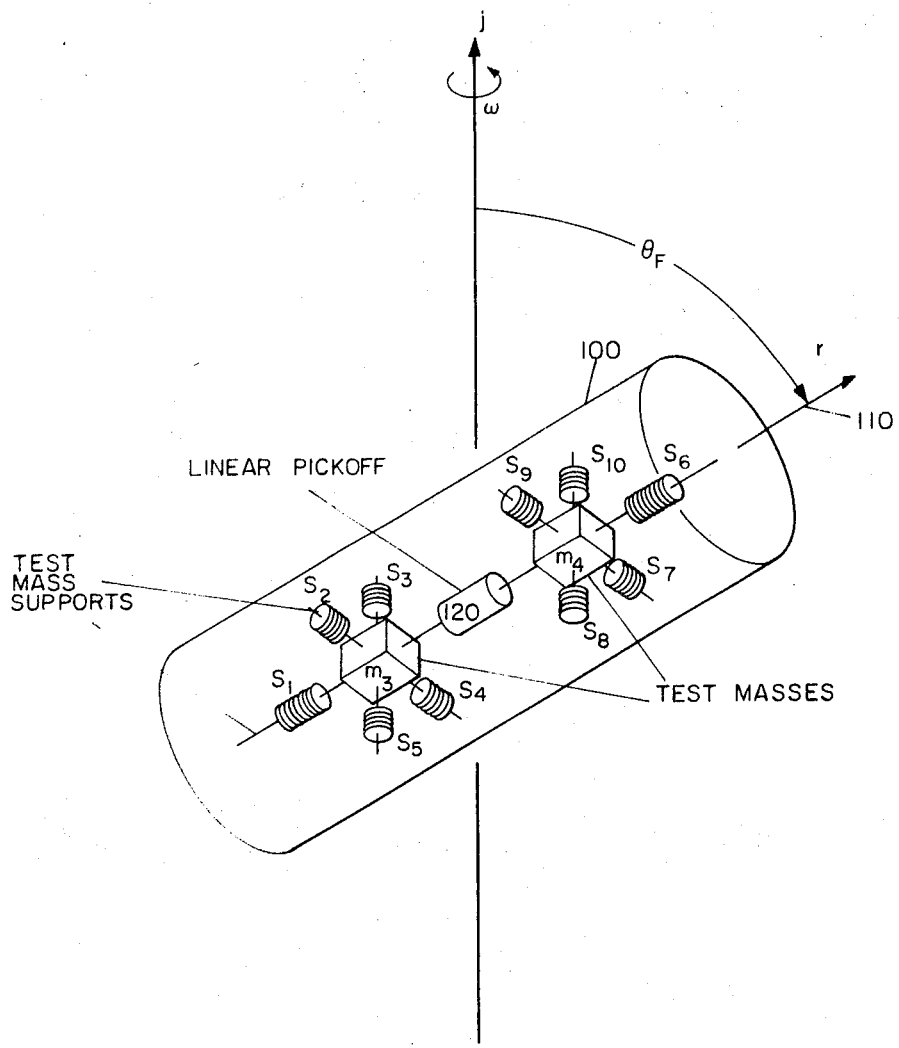
FIG. 4 is a view of an alternate embodiment of the gradient sensor, showing a longitudinal or in-line design.

As shown in FIG. 4, gradient sensor 100 incorporates masses $m_3$ and $m_4$, again suitably shaped to minimize measurement errors, moveable linearly along shaft 110 which is now coincident with axis $r$ as the output axis of the instrument. Also coupled to shaft 110 and located between masses $m_3$ and $m_4$ is linear pickoff 120. Masses $m_3$ and $m_4$ are suspended on shaft 110 in 5° of freedom by springs $s_1$–$s_5$ and $s_6$–$s_{10}$, respectively, such that the masses, responsive to the gravity gradient torques, differentially move (and/or exert force) along axis $r$. This differential movement is sensed by linear pickoff 120, fed back through a null feedback loop similar to that of FIG. 3 (except, of course, for the difference in float configuration), and a centrifugal balancing force is applied as before. The operation of the instrument, in other words, is identical for both the transverse and longitudinal gradient sensor.

As explained in the instrument analysis portion of the specification, the gravity gradiometer of FIG. 1 is designed to measure with one instrument all five independent components of the gravity gradient matrix in terms of the coordinates $i, j, k$ of the instrument. Further, except for the need for a symmetrical float mass configuration, these five components of gravity gradient matrix are not related to the size or shape of the mass configuration. Hence, there is no requirement for prior calibration or sensitivity measurement.

As is known in potential theory, there are nine gravity gradient components comprising the gravity gradient matrix. These components may be expressed in various symbologies, one such in common use being

| $G_{rr}$ | $G_{rv}$ | $G_{rt}$ |
| $G_{vr}$ | $G_{vv}$ | $G_{vt}$ |
| $G_{tr}$ | $G_{tv}$ | $G_{tt}$ |

Since certain of these components are identical, the matrix may be resolved into five independent components, all of which are measurable as aforementioned. This is explained in detail in the instrument analysis section of this specification.

For point of definition, the aforementioned gradients comprise both cross-gradients and "in-line" gradients. A cross-gradient of gravity is defined in the art as one relating rate of change of a given component of gravity at some point in space to translation of this point in space in a direction transverse to the direction of that component of gravity. The components $G_{xy}$, $G_{xz}$, and the like, are cross-gradients. An "in-line" gradient is defined as one relating rate of change of a given component of gravity at some point in space to translation of that point in space in the direction of the gravity component. The components $G_{xx}$, $G_{yy}$, and the like, are "in-line" gradients.

Instrument Analysis

Figure 5:
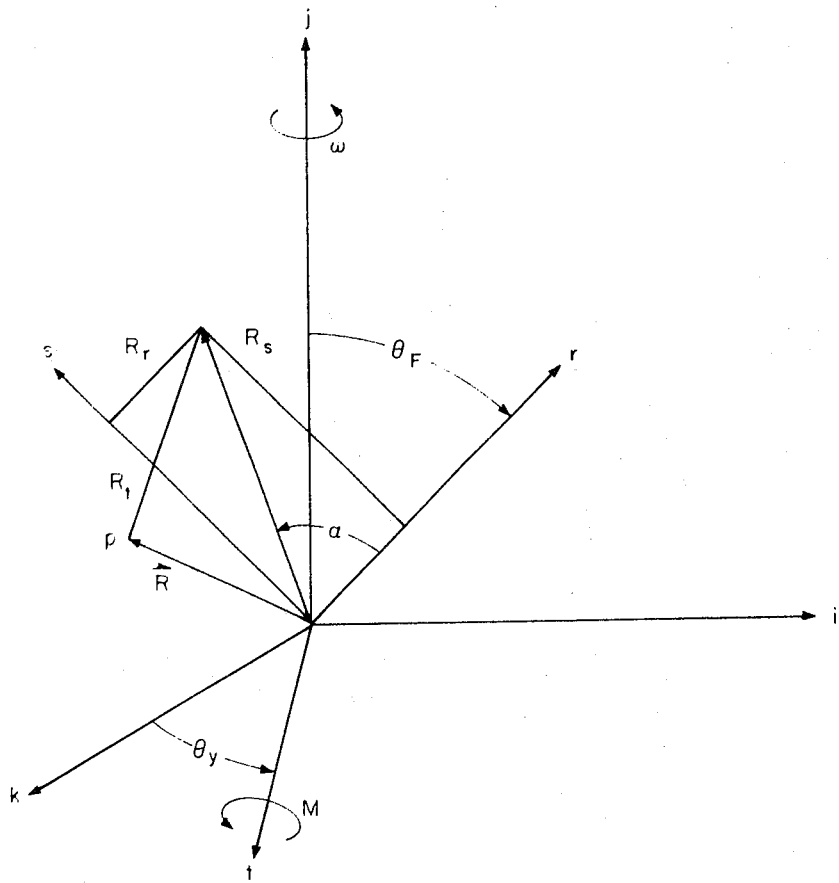
FIG. 5 is a schematic drawing of the reference coordinate systems used in describing the invention.

As an aid in understanding the concept and operation of the invention, the torques, (or forces) on the test mass configuration in the gradient sensor due to gravitational and acceleration forces are analyzed. In particular there are calculated the torques (or forces) due to a differential part of the test mass at point ($p$) which is located by vector displacement $\bar{R}$ from the origin of the reference coordinate system. As aforementioned, there is chosen an inertial reference coordinate system ($i, j, k$), with the $j$ axis aligned to the cage rotational axis, and the $k$ axis in an arbitrary direction. The reference coordinate systems employed throughout the specification are shown schematically in FIG. 5. The gravity gradient matrix ($|G|$) determination is in terms of this coordinate system. Another coordinate system ($r, s, t$) with the same origin is chosen, with the $t$ axis in the $i, k$ plane and rotated an angle $\theta_y$ from the $k$ axis, and with the $r$ axis at an angle $\theta_F$ from the $j$ axis. The second coordinate system is considered fixed to the test mass system, and is rotating about the $j$ axis at a rate $\omega$ (i.e., $\dot{\theta}_y$). Appropriately associated with these coordinate systems will be unit vectors $\hat{i}, \hat{j}, \hat{k}, \hat{r}, \hat{s}, \hat{t}$. Now, there is chosen a test mass which is symmetrical about the $r, t$ plane and about the $s, t$ plane. Because of this symmetry, any mass at point ($p$) located at $$\bar{R}_1 = R_r\hat{r} + R_s\hat{s} + R_t\hat{t} \quad (1)$$

will be accompanied by masses at $$\bar{R}_2 = -R_r\hat{r} + R_s\hat{s} + R_t\hat{t} \quad (2)$$
$$\bar{R}_3 = R_r\hat{r} - R_s\hat{s} + R_t\hat{t} \quad (3)$$
$$\bar{R}_4 = -R_r\hat{r} - R_s\hat{s} + R_t\hat{t} \quad (4)$$

A quartet of small equal masses at these points will be referred to as a test mass element.

To analyze the Transverse Centrifugal Balance Gradiometer, which is the preferred embodiment shown in FIG. 2, one must calculate the torque about the $t$ axis, due to a force $\bar{F}$ at point ($p$) located at $\bar{R}$ from the origin.

$$\bar{M} = \bar{R} \times \bar{F} \quad (5)$$
$$M_t = \bar{M} \cdot \hat{t} = \bar{F}(\bar{R} \times \hat{t}) \quad (6)$$

The gravitational force on a small particle of mass $dm$ located at point ($p$) will be $$d\bar{F}_g = dm[\bar{g} + |G|\bar{R}] \quad (7)$$

where $g$ is the gravitation attraction at the origin, and $|G|$ the gravity gradient matrix. The centrifugal force on that particle will be $$d\bar{F}_c = dm[\bar{\omega} \times (\bar{\omega} \times \bar{R})] \quad (8)$$

The torque about the $t$ axis due to the float mass element will be $$dM_t = -\sum_{n=1}^{4} d\bar{F}_n \cdot (\bar{R}_n \times \hat{t}) \quad (9)$$

$$d\bar{F}_n = d\bar{F}_{ng} + d\bar{F}_{nc}$$
$$= dm_n[\bar{g} + |G|\bar{R}_n] + dm_n[\bar{\omega} \times (\bar{\omega} \times \bar{R}_n)] \quad (10)$$

hence $$dM_t = -dm \sum_{n=1}^{4} \{\bar{g} \cdot (\bar{R}_n \times \hat{t}) + |G|\bar{R}_n \cdot (\bar{R}_n \times \hat{t})$$
$$-\omega^2 [\hat{j} \times (\hat{j} \times \bar{R}_n)] \cdot [\bar{R}_n \times \hat{t}]\} \quad (11)$$

let $$\Delta R = \sqrt{R_r^2 + R_s^2} \quad (12)$$
$$\alpha = \tan^{-1}\frac{R_s}{R_r} \quad (13)$$

Note that $$\begin{bmatrix} \hat{r} \\ \hat{s} \\ \hat{t} \end{bmatrix} = \begin{bmatrix} \sin\theta_f \cos\theta_y & \cos\theta_f & -\sin\theta_f \sin\theta_y \\ -\cos\theta_f \cos\theta_y & \sin\theta_f & \cos\theta_f \sin\theta_y \\ \sin\theta_y & 0 & \cos\theta_y \end{bmatrix} \begin{bmatrix} \hat{i} \\ \hat{j} \\ \hat{k} \end{bmatrix}$$

$$(14)$$

and that for any gravity gradient matrix $$G_{xx} + G_{yy} + G_{zz} = 0 \quad (15)$$
$$G_{xz} = G_{zx} \quad (16)$$
symmetry $xy = G_{yx} \quad (17)$
sensitivity $G_{yz} = G_{zy} \quad (18a)$ where $$G_{ab} = \frac{\partial^2 U}{\partial a \partial b} \quad (18b)$$

and $U$ is the gravitational potential.

Let us define $$\frac{1}{2}(G_{zz} - G_{xx}) = G_{HD} \quad (19)$$
$$G_{xx} = G_{01} \quad (20)$$
$$G_{xy} = G_{02} \quad (21)$$
$$G_{yz} = G_{03} \quad (22)$$
$$\theta_N = \theta_F - \pi/4 \quad (23)$$

Performing the operations indicated in the equations above results in:

$$dM_t = -2dm(\Delta R^2 \cos 2\alpha \sin 2\theta_f[A] - \omega^2 \Delta R^2 \cos 2\alpha \sin 2\theta_f) \quad (24)$$

where [$A$] is detailed in equation (27) below, and $$\begin{matrix} \Delta R < 0 \\ 0 \leq \alpha < \pi/2 \end{matrix} \quad (25)$$

because of symmetry.

Since the operation of the instrument is to keep the angle $\theta_F$ constant (hence $\theta_N$ constant), it is seen that the net torque exerted on the test mass must be zero. In the absence of disturbance torques, equation (24) becomes $$\omega^2_{(Trans)} = [A]$$
$$= 3/2 G_{yy} - 2 \tan 2\theta_N \sqrt{G_{02}^2 + G_{03}^2} \sin\left(\theta_y - \tan^{-1}\frac{G_{02}}{G_{03}}\right)$$
$$+ \sqrt{G_{HD}^2 + G_{01}^2} \sin\left(2\theta_y + \tan^{-1}\frac{G_{HD}}{G_{01}}\right)$$

$$(26)$$

By a similar analysis for the Longitudinal Sensor of FIG. 4, where the tension between the float masses is given by $$T = \bar{F} \cdot \hat{r}, \quad (27)$$

the balanced condition for a Longitudinal Gradient Sensor will result in the following rotation rate $$\omega^2_{(Long)} = G_{yy}(1/2 - \text{ctn}^2 \theta_F)$$
$$+ 2 \text{ctn } \theta_F \sqrt{G_{02}^2 + G_{03}^2} \sin\left(\theta_y - \tan^{-1}\frac{G_{02}}{G_{03}}\right)$$
$$+ \sqrt{G_{HD}^2 + \left(\frac{G_{01}}{2}\right)^2} \sin\left(2\theta_y + \tan^{-1}\frac{2G_{HD}}{G_{01}}\right)$$

$$(28)$$

Thus knowing $\theta_F$ (or $\theta_N$) and a time history of $\theta_y$ (recalling that $\dot{\theta}_y = \omega$), one can deduce all five independent components of the gravity gradient matrix in terms of the coordinates $i, j, k$ of the gradiometric instrument. Further, these components of the gravity gradient matrix are determined solely by $\theta_N$, $\theta_y$ and $\dot{\theta}_y$ and are not related to the size or shape, assuming symmetry of the float mass. Thus, the determination does not require any previous calibration or sensitivity measurement of the gradient sensor.

Figure 6:
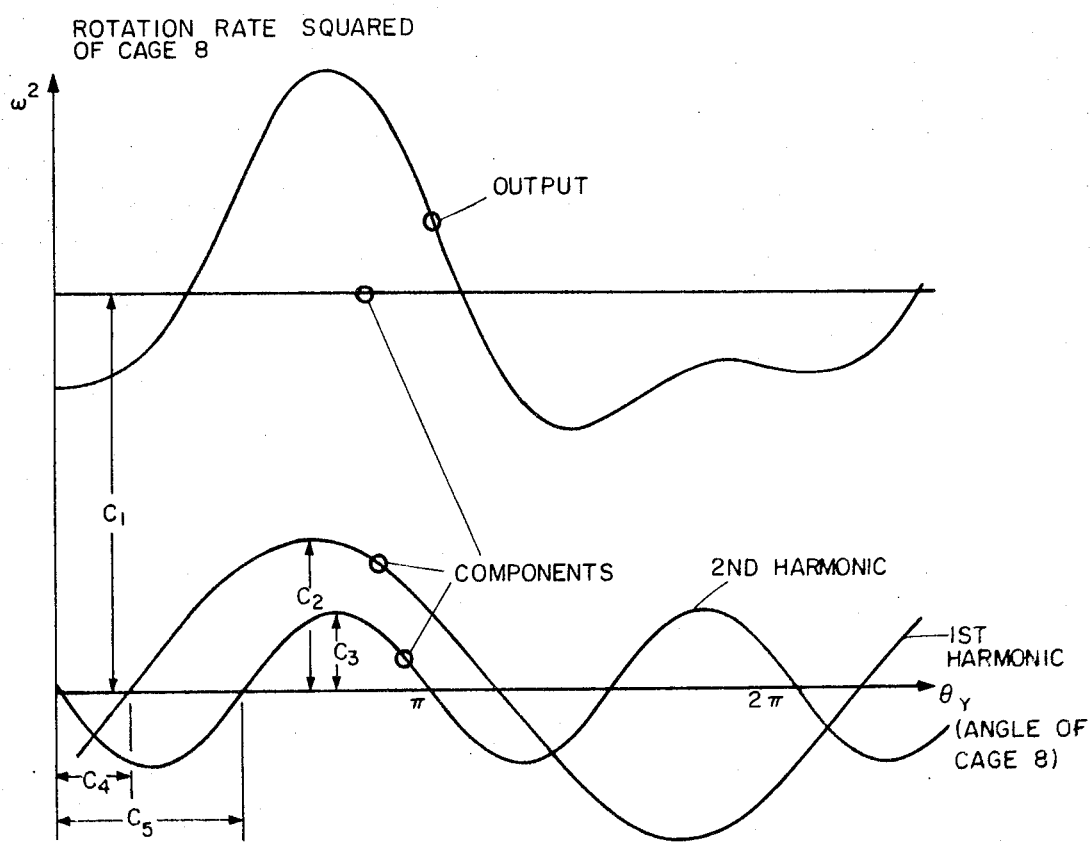
FIG. 6 is a plot of a typical set of output data from the gradiometer of the invention.

FIG. 6 presents a typical set of data (output) from the Centrifugal Balance gradiometer. The five independent components of the gravity gradient matrix are extracted and appropriately labeled as $C_1$ through $C_5$. For the two types of gradient sensor, the five components extracted from the instrument's output are as follows:

| | Transverse | Longitudinal |
|---|---|---|
| $C_1 =$ | $3/2 G_{yy}$ | $(1/2 - \text{ctn } \theta_F) G_{yy}$ |
| $C_2 =$ | $2 \tan 2\theta_N \sqrt{G_{02}^2 + G_{03}^2}$ | $2 \text{ctn } \theta_F \sqrt{G_{02}^2 + G_{03}^2}$ |
| $C_3 =$ | $\sqrt{G_{HD}^2 + G_{01}^2}$ | $\sqrt{G_{HD}^2 + (1/2 G_{01})^2}$ |
| $C_4 =$ | $\tan^{-1}\left(\frac{G_{02}}{G_{03}}\right)$ | $\tan^{-1}\left(\frac{G_{02}}{G_{03}}\right)$ |
| $C_5 =$ | $-1/2 \tan^{-1}\left(\frac{G_{HD}}{G_{01}}\right)$ | $-1/2 \tan^{-1}\left(\frac{2G_{HD}}{G_{01}}\right)$ |

As shown in FIG. 6, the component represented by $C_1$ is related to the average amplitude of the output waveform. Components $C_2$ and $C_3$ are related to the amplitude of the first and second harmonics, respectively, of the output waveform.

Likewise, components $C_4$ and $C_5$ are related to the phase of the first and second harmonics, respectively, of the output waveform.

As a general comment, for the case of gradients which are symmetrical about the vertical, the cage axis ($j$) should be within 63° of the vertical to ensure stable operation. This is to avoid the possibility, shown in the equations, of having an orientation such that the gradient effects cause moments or tensions on the mass configuration that are in the same direction as the moments or tensions due to the centrifugal effects.

While a particular embodiment of the invention has been described, the invention is not intended to be limited to those details. Various modifications may be made and yet remain within the scope of the invention.

For example, although, in the preferred embodiment the system is mounted on a stabilized base, under some conditions the system should be capable of being relatively insensitive of base motion effects without such a stabilized base.

Further, the cage could be rotated at a predetermined rate which would correspond to a best estimate of the existing gravity gradient stress. The rotation of the test mass about the $t$ axis or, in the case of the longitudinal gradient sensor, the level of tension would then be an indication of the error in the gradient stress estimate. Alternately, an external torque (or force) could be applied to the test mass in a feedback control loop fashion to maintain a balance during the predetermined cage rotation rate. This applied torque (or force) could be applied with a very large sensitivity and would be a measure of the error in the gradient estimate. This last variation would require, of course, an instrument calibration.

Having thus described my invention, I claim:

1. A gradiometer for measuring gravity gradients without prior calibration, comprising:
   a. a base;
   b. a chamber mounted on said base;
   c. a cage contained within said chamber and coupled to said chamber such as to be rotatable relative to said chamber about an axis of rotation maintained within 63° of the vertical;
   d. a gradient sensor comprising a symmetrically configured case having an output axis along the axis of symmetry and an input axis orthogonal to said output axis, said case being fixedly mounted within said cage such that said input axis coincides with said axis of rotation of said cage, said gradient sensor further comprising a symmetrical mass configuration suspended within said case and having an output axis coincident with the output axis of said case, said mass being moveable relative to said case in a direction and at a velocity indicative of the forces due to the gravity gradients acting on said mass;
   e. means for sensing said movement of said mass;
   f. means responsive to said sensing means for rotating said cage in a direction and at an angular velocity such as to induce centrifugal forces on said mass equal in magnitude and opposite in direction to said forces due to said gravity gradients;
   g. means for measuring the direction and angular velocity of said cage rotation.

2. The gradiometer of claim 1 wherein said case is a cylinder and said mass configuration is cylindrically configured and further wherein said movement of said mass relative to said case is rotational about said output axis.

3. The gradiometer of claim 2 wherein said mass is a float and further including a viscous floating and damping fluid within said case in which said float is supported.

4. The gradiometer of claim 2 wherein said means for sensing said rotation of said float is an electric signal generator comprising a rotor coupled to said float and a stator coupled to said case and having stator windings to produce an output signal voltage dependent on the deflection of said float with respect to said case.

5. The gradiometer of claim 1 wherein said case is a cylinder and said mass configuration comprises two masses linearly movable relative to each other along said output axis.

6. The gradiometer of claim 5 wherein said means for sensing said linear movement of said masses is a linear pickoff which measures the differential movement of said masses and generates an output voltage proportional there thereto.

* * * * *